(12) United States Patent
Chang

(10) Patent No.: US 6,193,324 B1
(45) Date of Patent: Feb. 27, 2001

(54) WHEEL DEVICE

(76) Inventor: Wen-Chen Chang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/349,804

(22) Filed: Jul. 9, 1999

(51) Int. Cl.[7] .................................................. B60B 19/00
(52) U.S. Cl. ........................ 301/111; 301/125; 190/18 A
(58) Field of Search ..................................... 301/111, 119, 301/120, 121, 122, 125; 280/47.26; 190/18 A; 16/18 R, 45, 46

(56) References Cited

U.S. PATENT DOCUMENTS

| | | | |
|---|---|---|---|
| 4,192,408 | * | 3/1980 | Walker ............................... 190/18 A |
| 4,707,881 | * | 11/1987 | Van Hoye ................................. 16/44 |
| 4,719,663 | * | 1/1988 | Termini ........................... 190/18 A X |
| 5,813,503 | * | 9/1998 | Chang ................................. 190/18 A |
| 5,918,710 | * | 7/1999 | Sher .................................... 190/18 A |
| 5,921,635 | * | 7/1999 | Deliman et al. ....................... 301/111 |

* cited by examiner

*Primary Examiner*—Russell D. Stormer

(57) ABSTRACT

A wheel device has a wheel support seat, a wheel inserted in the wheel support seat, and a fixed seat engaging with the wheel support seat. The wheel support seat has a convex housing, two outer positioning plates, two inner guide grooves, two click blocks, and an upper positioning bar. Each outer positioning plate has a through aperture. The fixed seat has a convex portion, a step plate, a recess, an inner notch, an oblong groove, and two click holes. The click blocks are inserted in the click holes. The upper positioning bar is inserted in the oblong groove. A rivet passes through the through aperture and the center hole.

2 Claims, 8 Drawing Sheets

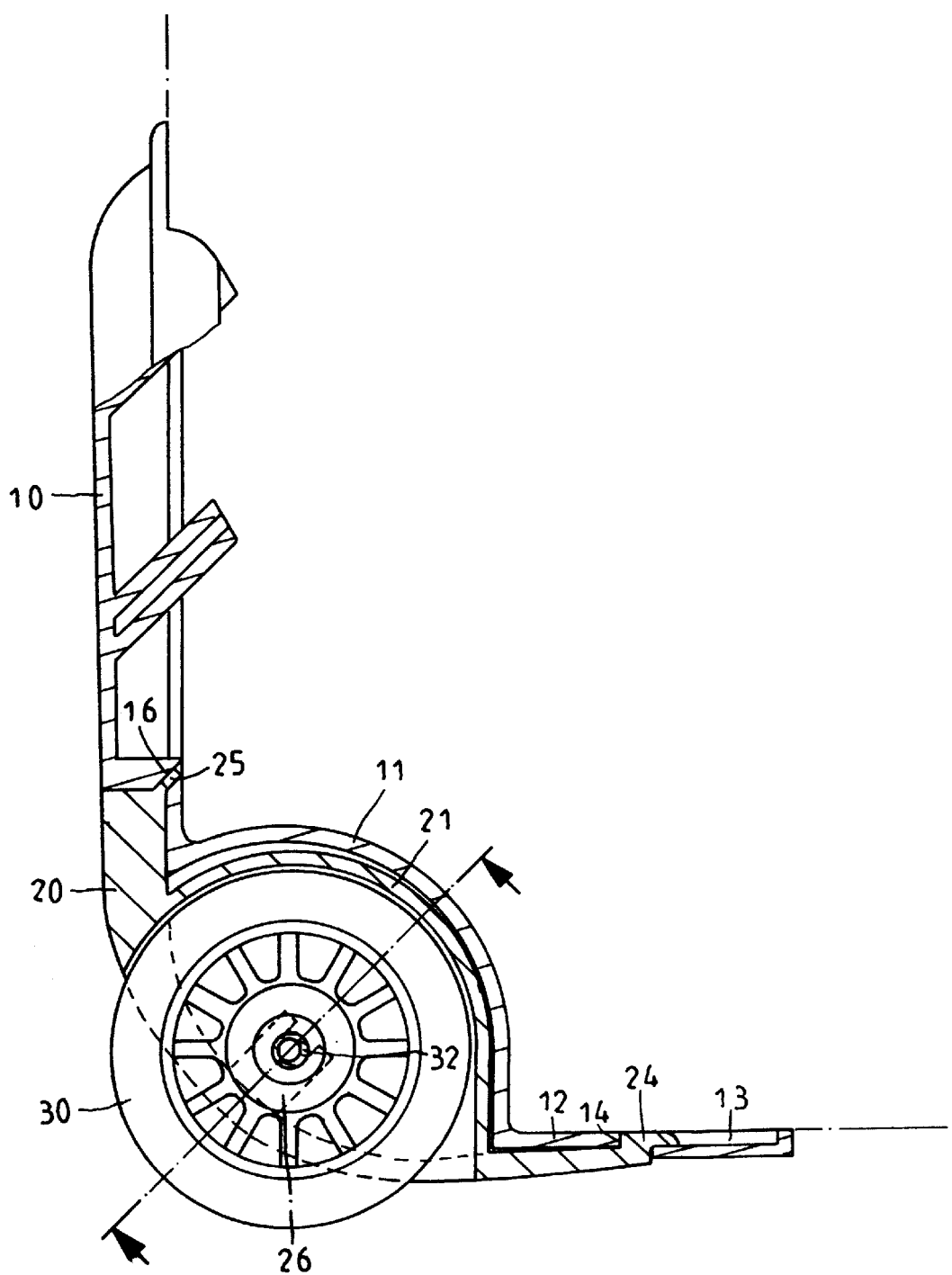
FIG: 3

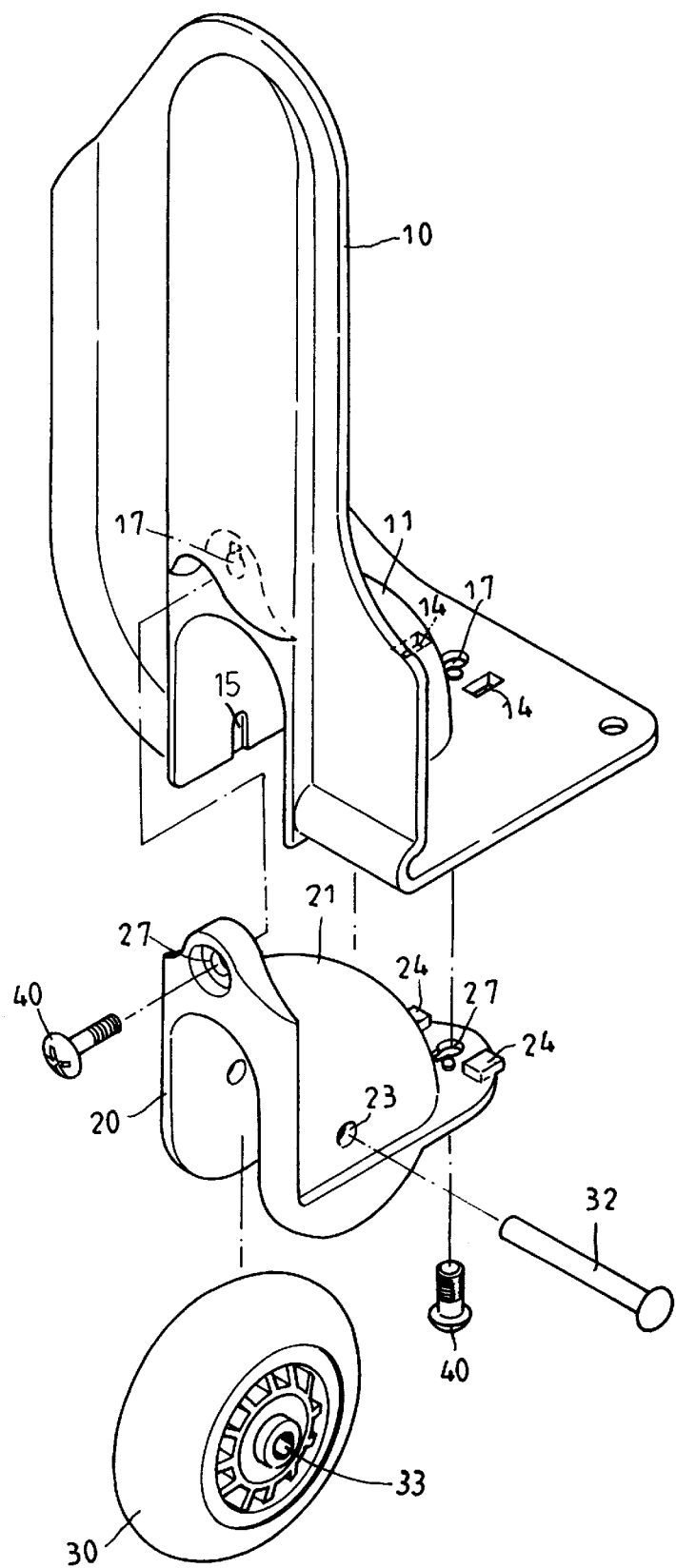
FIG: 4

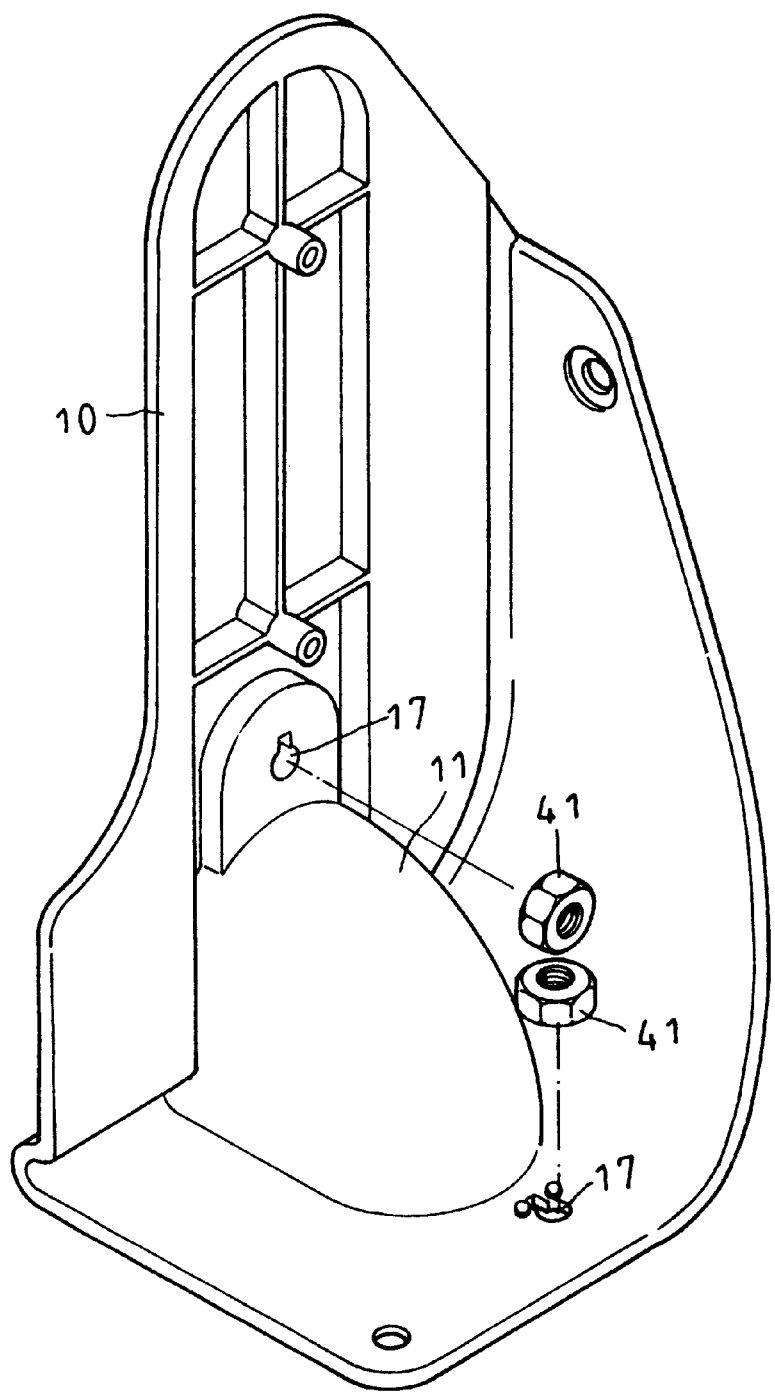
F I G : 4A

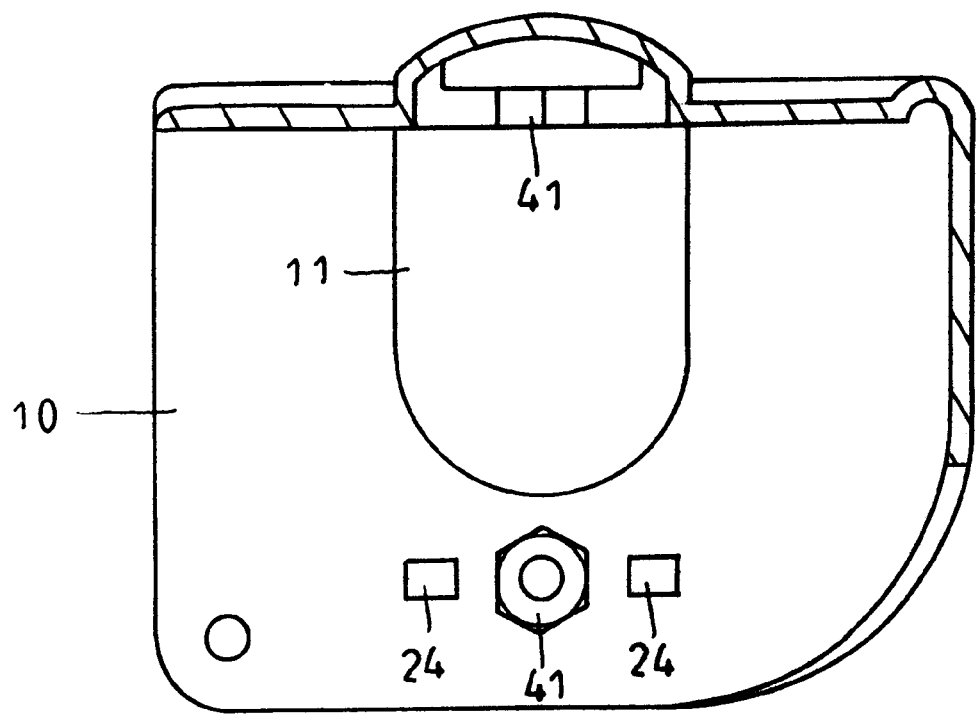
FIG:5

WHEEL DEVICE

BACKGROUND OF THE INVENTION

The present invention relates to a wheel device. More particularly, the present invention relates to a wheel device for a suitcase.

A suitcase has four conventional wheel devices. The conventional wheel device has a fixed wheel support seat. If the fixed wheel support seat is damaged, the user cannot replace the fixed wheel support seat.

SUMMARY OF THE INVENTION

An object of the present invention is to provide a wheel device which has a wheel support seat to be detached easily while the wheel support seat is damaged.

In accordance with a first preferred embodiment of the present invention, a wheel device comprises a wheel support seat, a wheel inserted in the wheel support seat, and a fixed seat engaging with the wheel support seat. The wheel has a center hole. The wheel support seat has a convex housing, two outer positioning plates, two inner guide grooves matching the outer positioning plates, two click blocks, and an upper positioning bar. Each of the outer positioning plates has a through aperture. The fixed seat has a convex portion matching the convex housing, a step plate, a recess, an inner notch, an oblong groove, and two click holes formed on the step plate. The click blocks are inserted in the click holes. The upper positioning bar is inserted in the oblong groove. A rivet passes through the through aperture and the center hole.

In accordance with a second preferred embodiment of the present invention, a wheel device comprises a wheel support seat, a wheel inserted in the wheel support seat, and a fixed seat engaging with the wheel support seat. The wheel has a center hole. The wheel support seat has a convex housing, two click blocks, two through holes, and a through aperture. The fixed seat has a convex portion matching the convex housing, two oblong holes matching the through holes, and two click holes. The click blocks are inserted in the click holes. A rivet passes through the through aperture and the center hole. Two bolts fasten the wheel support seat and the fixed seat together via the through holes and the oblong holes.

BRIEF DESCRIPTION OF THE DRAWINGS

FIG. 3 is a schematic view illustrating a wheel device of a first preferred embodiment disposed on a suitcase;

FIG. 4 is a perspective exploded view of a wheel device of a second preferred embodiment in accordance with the present invention;

FIG. 4A is a perspective view of a fixed seat of a second preferred embodiment in accordance with the present invention;

FIG. 5 is a sectional assembly view of a wheel device of a second preferred embodiment without a wheel.

DETAILED DESCRIPTION OF THE INVENTION

Figure 1:
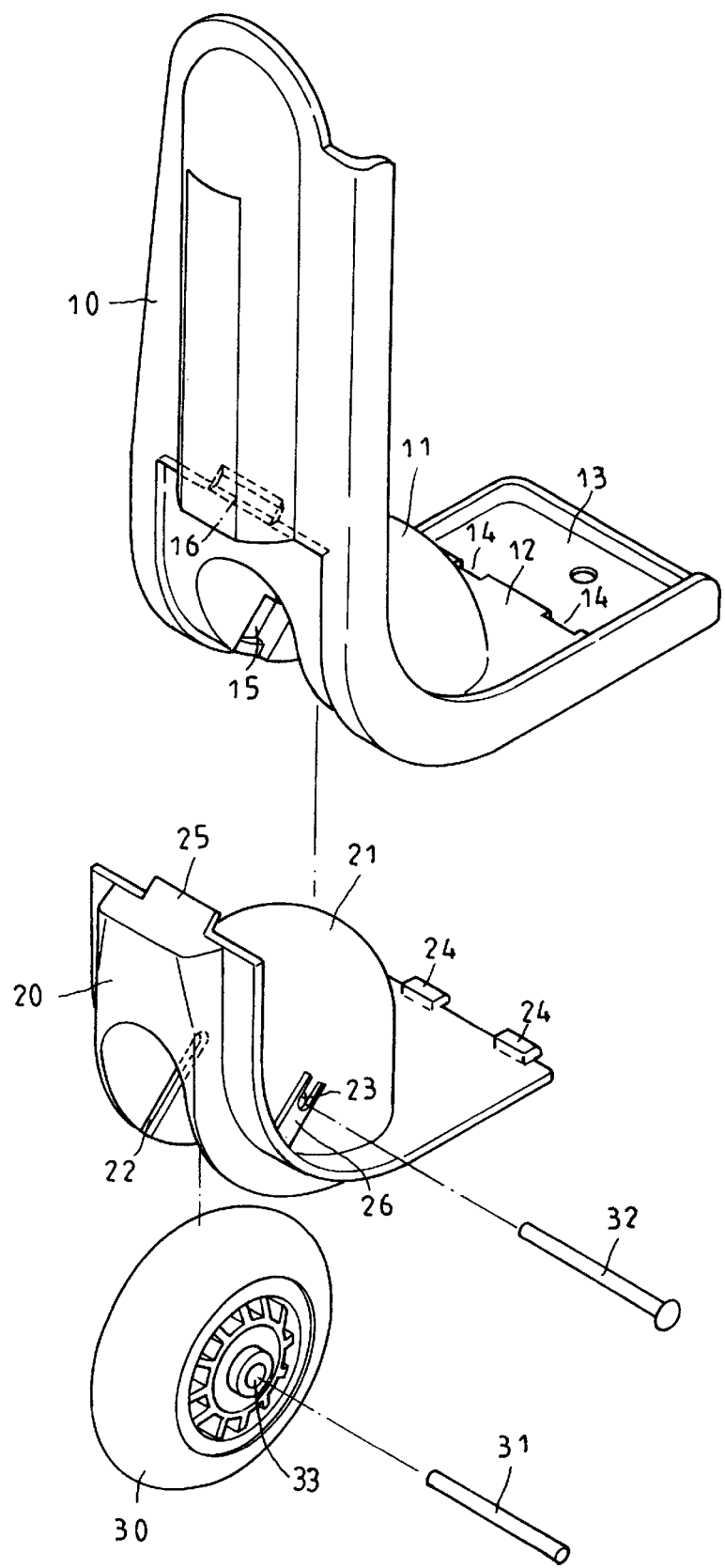
FIG. 1 is a perspective exploded view of a wheel device of a first preferred embodiment in accordance with the present invention.
Figure 1A:
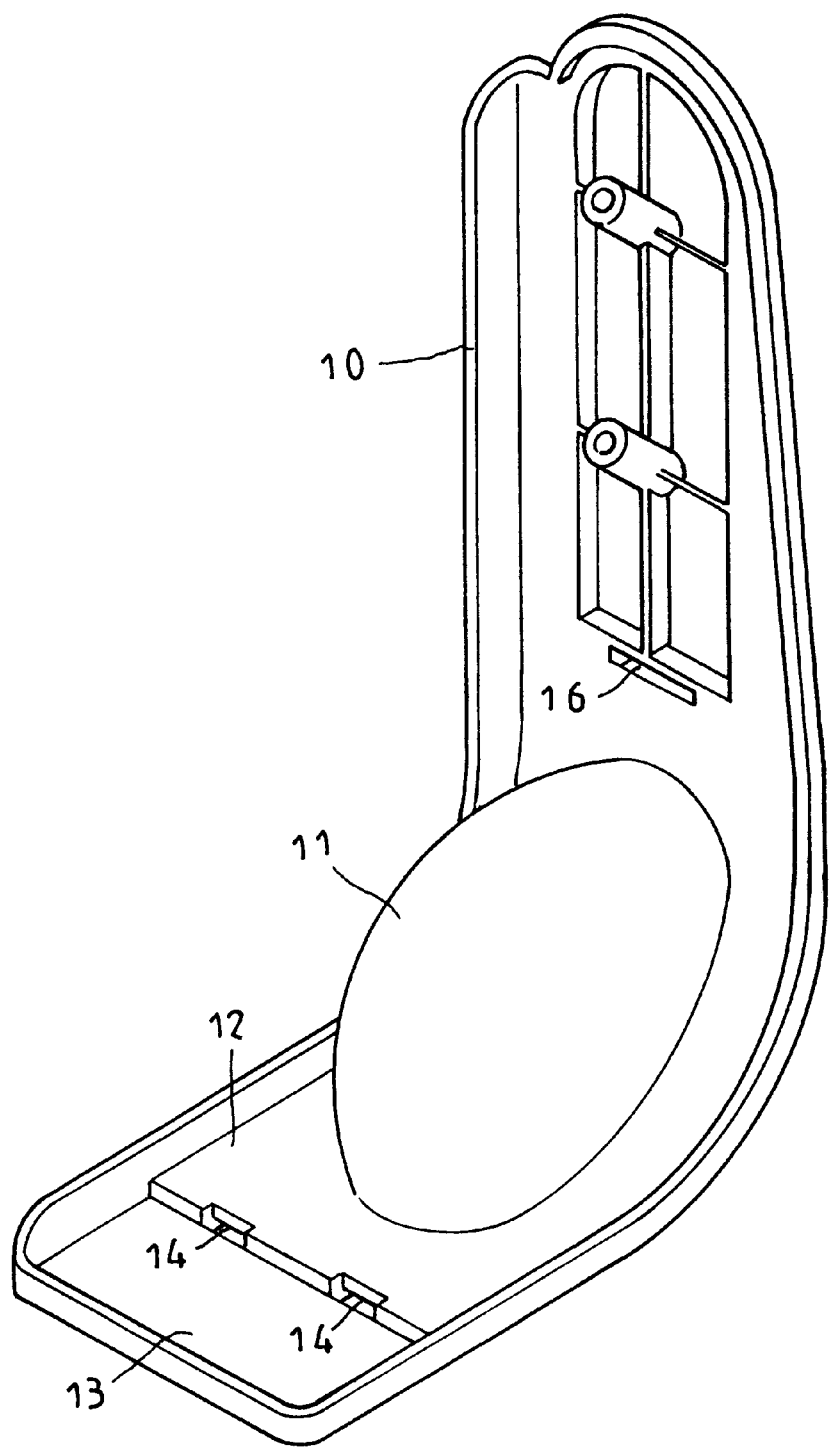
FIG. 1A is a perspective view of a fixed seat of a first preferred embodiment in accordance with the present invention.
Figure 2:
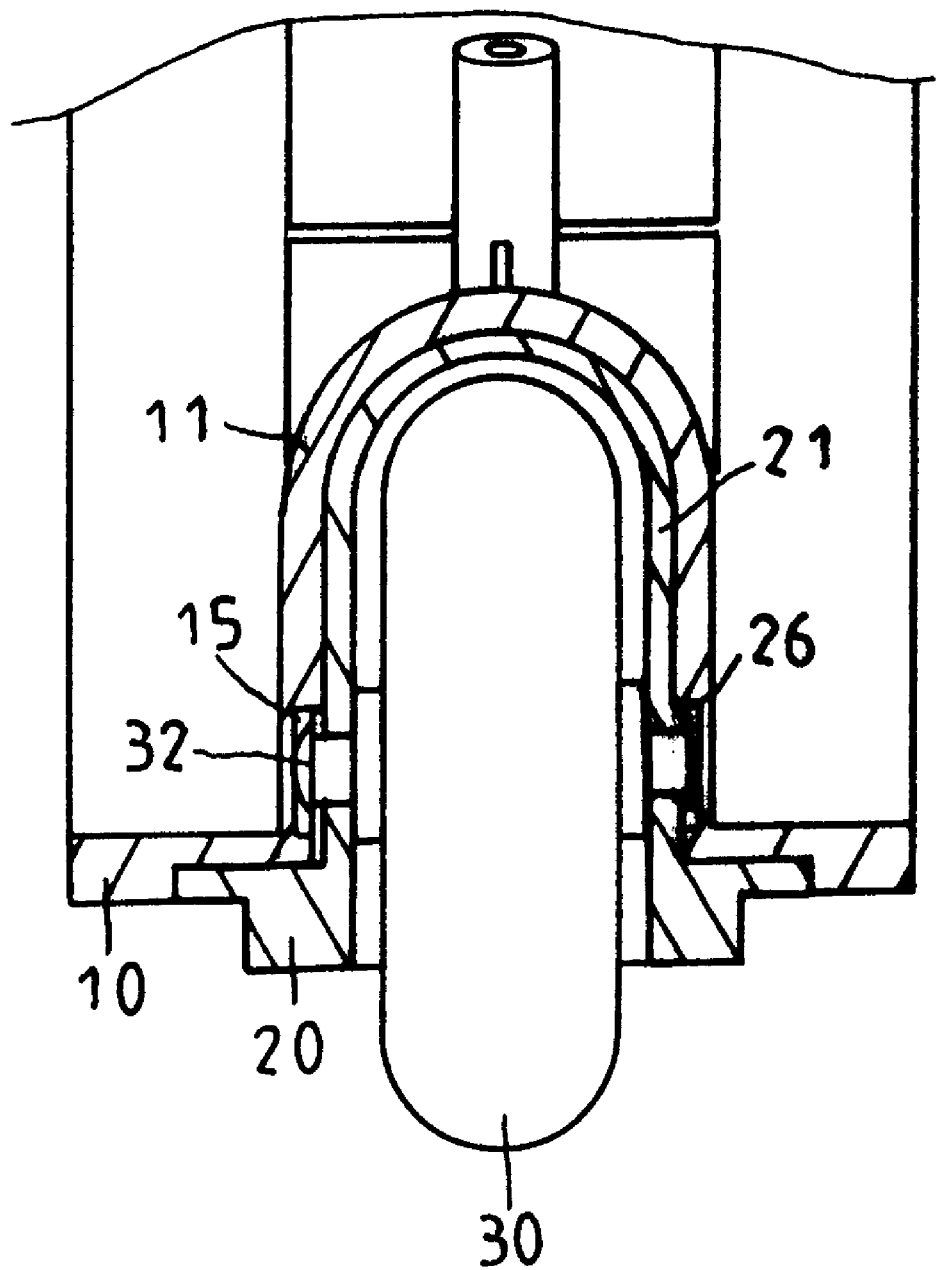
FIG. 2 is a sectional assembly view of a wheel device of a first preferred embodiment in accordance with the present invention.

Referring to FIGS. 1 to 3, a wheel device comprises a wheel support seat 20, a wheel 30 inserted in the wheel support seat 20, and a fixed seat 10 engaging with the wheel support seat 20. The wheel 30 has a center hole 33.

The wheel support seat 20 has a convex housing 21, two outer positioning plates 26, two inner guide grooves 22 matching the outer positioning plates 26, two click blocks 24, and an upper positioning bar 25.

Each of the outer positioning plates 26 has a through aperture 23.

The fixed seat 10 has a convex portion 11 matching the convex housing 21, a step plate 12, a recess 13, an inner notch 15, an oblong groove 16, and two click holes 14 formed on the step plate 12.

The click blocks 24 are inserted in the click holes 14.

The upper positioning bar 25 is inserted in the oblong groove 16.

A pin 32 passes through the through aperture 23 and the center hole 33 along the inner guide grooves 22. A rivet 31 is inserted through the through aperture 23 and the center hole 33 to force the pin 32 disengaging from the through aperture 23 and the center hole 33.

The fixed seat 10 is fastened on a bottom of a suitcase.

Figure 6:
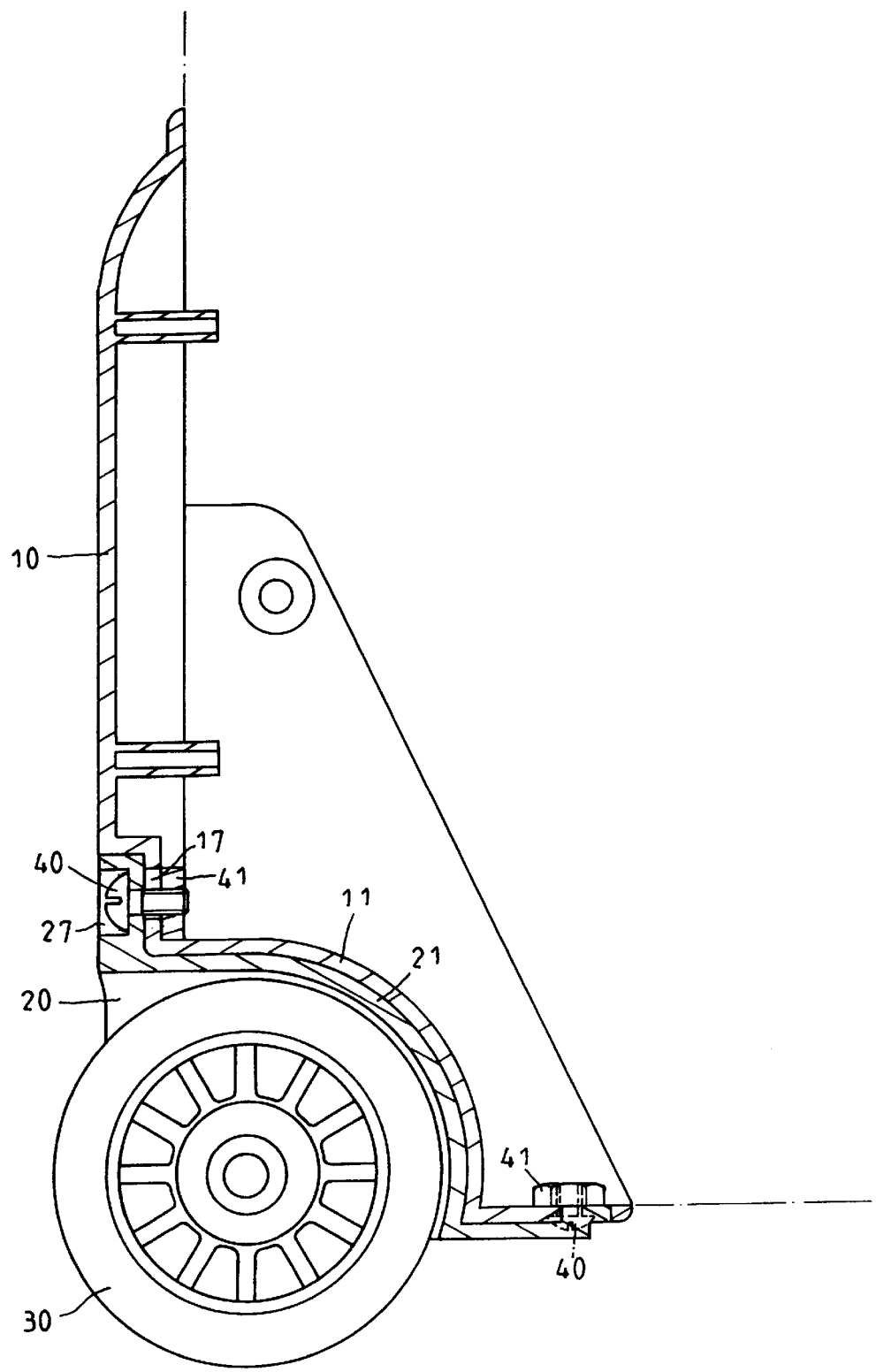
FIG. 6 is a schematic view illustrating a wheel device of a second preferred embodiment disposed on a suitcase.

Referring to FIGS. 4 to 6, another wheel device comprises a wheel support seat 20, a wheel 30 inserted in the wheel support seat 20, and a fixed seat 10 engaging with the wheel support seat 20. The wheel 30 has a center hole 33.

The wheel support seat 20 has a convex housing 21, two click blocks 24, two through holes 27, and a through aperture 23.

The fixed seat 10 h as a convex portion 11 matching the convex housing 21, two oblong holes 17 matching the through holes 27, and two click holes 14.

The click blocks 24 are inserted in the click holes 14.

A rivet 32 passes through the through aperture 23 and the center hole 33.

Two bolts 40 fasten the wheel support seat 20 and the fixed seat 10 together via the through holes 27 and the oblong holes 17. Two nuts 41 engage with the bolts 40.

The present invention is not limited to the above embodiments but various modification thereof may be made. Furthermore, various changes in form and detail may be made without departing from the scope of the present invention.

I claim:

1. A wheel device comprises:

a wheel support seat, a wheel inserted in the wheel support seat, and a fixed seat engaging with the wheel support seat, the wheel having a center hole, the wheel support seat having a convex housing, two outer positioning plates, two inner guide grooves facing the outer positioning plates, two click blocks, and an upper positioning bar, each of the outer positioning plates having a through aperture, the fixed seat having a convex portion matching the convex housing, a step plate disposed on a transverse portion of the fixed seat, a recess formed on the transverse portion of the fixed seat, an inner notch formed in a bottom portion of the fixed seat, an oblong groove, and two click holes formed on the step plate, the click blocks inserted in the click holes, the upper positioning bar inserted in the oblong groove, and a rivet passing through the through aperture and the center hole.

2. The wheel device as claimed in claim 1, wherein the wheel support seat has two through holes, the fixed seat has two oblong holes matching the through holes, and two bolts fasten the wheel support seat and the fixed seat together through the through holes and the oblong holes.

* * * * *